March 3, 1964 E. L. ADAMS 3,122,787
APPARATUS AND METHOD FOR MOLDING CELLULAR ARTICLES
Filed Nov. 18, 1960 2 Sheets-Sheet 1

INVENTOR
ELMER L. ADAMS
BY
*W. A. Schaich & Charles L. Lynch*
ATTORNEYS

March 3, 1964  E. L. ADAMS  3,122,787
APPARATUS AND METHOD FOR MOLDING CELLULAR ARTICLES
Filed Nov. 18, 1960  2 Sheets-Sheet 2
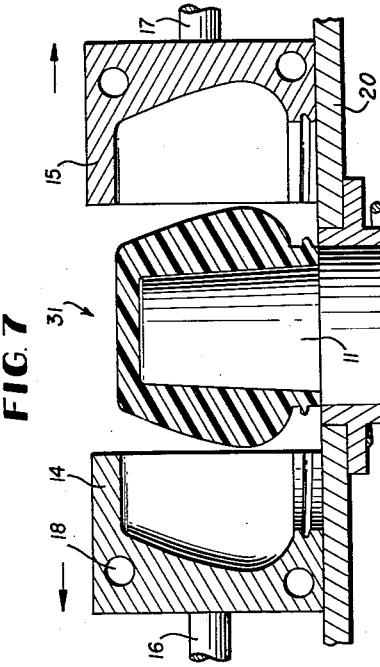
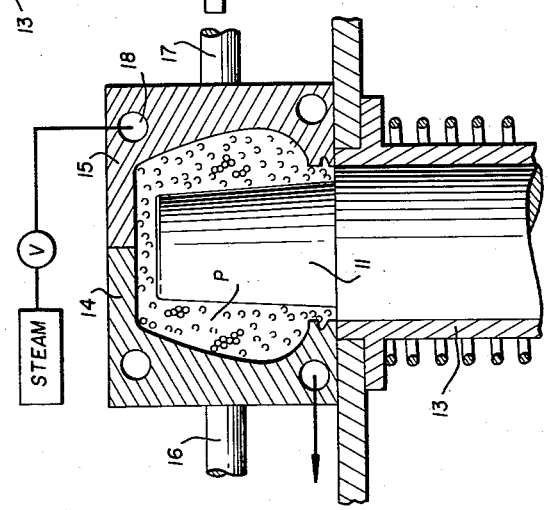
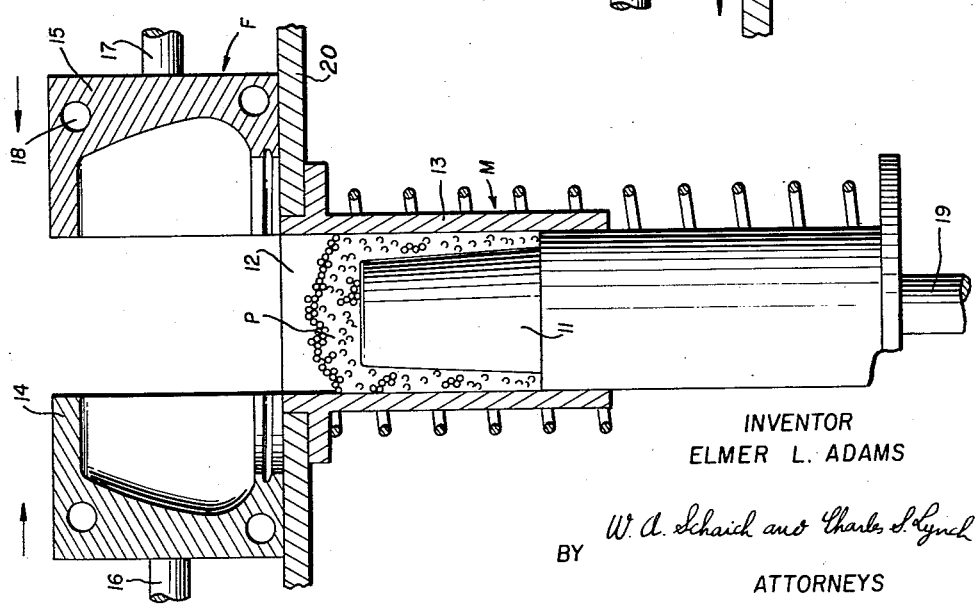
INVENTOR
ELMER L. ADAMS
BY W. A. Schaich and Charles S. Lynch
ATTORNEYS 3,122,787
APPARATUS AND METHOD FOR MOLDING
CELLULAR ARTICLES
Elmer L. Adams, Toledo, Ohio, assignor to Owens-Illinois
Glass Company, a corporation of Ohio
Filed Nov. 18, 1960, Ser. No. 70,350
7 Claims. (Cl. 18—5)

This invention relates to an apparatus and method for molding cellular plastic or foamed plastic articles.

A number of methods employing appropriate apparatus have been devised for molding cellular or foamed plastic articles from heat expandable plastic beads such as polystyrene beads. One such method involves the placement of a volume of expandable plastic beads into the female mold cavity of a two part mold, thereafter closing the mold by means of the male force plug, and then applying heat to cause the plastic beads to expand and fuse together. The mold is then cooled, and the molded cellular or foamed plastic article removed. However, the difficulty with the aforementioned method is that there is no positive provision for effecting a distribution of the plastic beads within the female mold cavity and about the male force plug. Accordingly it would be desirable to have available in the plastic molding art mold means which would prevent the excessive accumulation of the plastic beads in the lower extremities of the female mold cavity and a deficiency of plastic molding material in the upper regions of the mold cavity.

It is therefore, an object of this invention to provide a novel mold construction whereby a uniform distribution of molding materials occurs in the mold cavity. A further object of this invention is to provide a novel mold construction wherein positive distribution of molding materials within the mold takes place. A further object of this invention is to provide a novel mold construction which is admirably suited to the molding of expandable plastic beads. A further object of this invention is to provide a method for positive uniform distribution of molding materials within a molding device. Further objects will be evident from the description which follows.

In brief the present invention consists of a molding apparatus comprising a reciprocable female mold which cooperates with a male force plug having a slidable annular member mounted around the force plug, such as a spring mounted sleeve or tube, to provide lost motion and which member facilitates the even distribution of the plastic bead molding material and also assists in ejecting the finished molded article from the force plug. Although auxiliary spring mounted means have been employed with molding apparatus (see U.S. 2,624,296), none are known to be used in the manner herein disclosed and claimed.

The present invention will be more completely understood by reference to the following descriptions and drawings wherein:

FIGURES 5 and 6 are comparable to FIGURES 1 and 2, respectively, except for the use of a split female mold.

FIGURE 7 is a cross-section view showing the finished article upon completion of the molding cycle with the female mold in open position.

FIGURE 8 is a sectional view of a modification of the FIGURE 2 apparatus.

Figure 1:
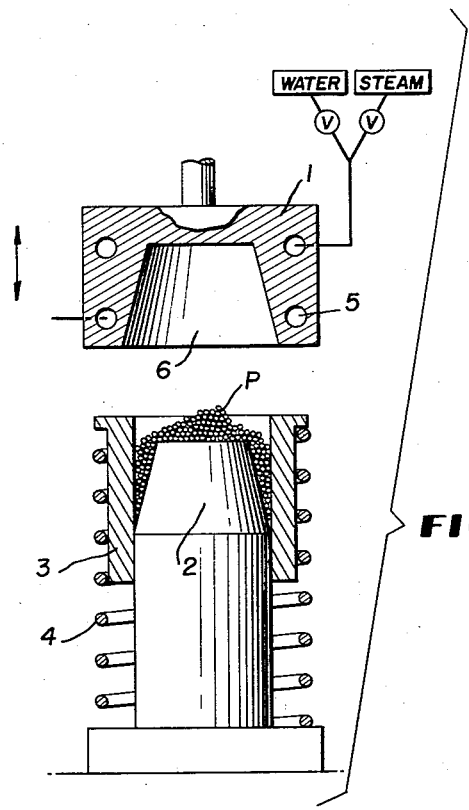
FIGURE 1 is a schematic cross-section view showing the mold elements in open position.
Figure 2:
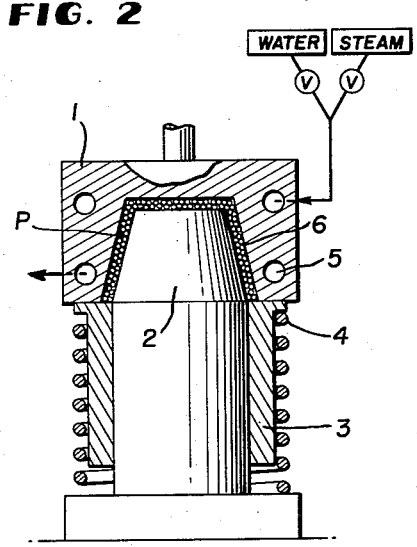
FIGURE 2 is a schematic cross-section view showing the mold elements in closed position and also one type of mold heating.

Referring to FIGURE 1, a molding apparatus in open position is shown consisting essentially of a reciprocable upper female mold 1 having openings 5 for the introduction of heating and cooling fluids and having a cavity 6 corresponding to a lower male mold plug 2. Surrounding the mold plug is a loading tube 3 mounted on springs 4. At the beginning of the molding operation as illustrated by FIGURE 1, a measured amount of expandable plastic beads, such as polystyrene beads, is placed in the top of the mold plug 2. More specifically the beads can be said to have been placed in an open lower mold structure or cavity of varying capacity and contour whose boundaries are defined by plug 2 and loading tube 3. Some of the beads will fall down into the crevice between the plug 2 and the loading tube 3, but most of them will be retained in a pile on top of the plug. When the upper mold is lowered, it will first contact the loading tube and gradually force it downward. As the loading tube retracts, the beads piled on the end of the plug will fall down into the space formed between the mold plug and female mold cavity. As the mold cavity reaches its lowest position as shown in FIGURE 2, a complete uniform distribution of the plastic beads occurs due to gravity and cooperative action of the mold parts. From the foregoing it will be evident that the loading tube cooperates with the mold plug to form a receptacle or reservoir of varying contour and capacity for the retention and distribution of the beads. Heat is then applied by injecting steam into openings 5 of mold 1 which in turn heats the plastic beads P causing them to expand and fuse together. After the container is formed, the mold is permitted to cool and mold 1 is then raised which results in the loading tube returning to its extended position. In so doing it will force the mold container off the mold plug. If desired, a channel (not shown) can be drilled in plug 2 which would terminate at the top surface of the plug. By connecting a source of air under pressure thereto, which is an expedient well known in the art, the finished article could be jet ejected from the final molding station.

Figure 3:
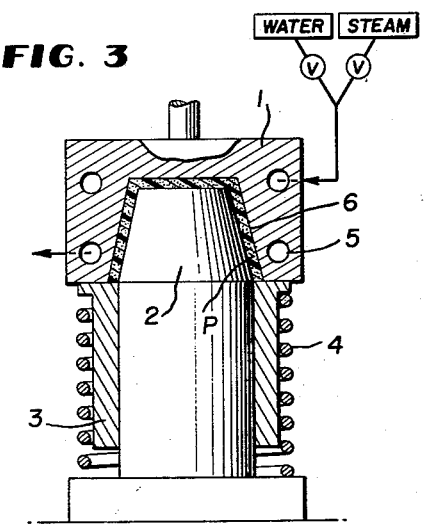
FIGURE 3 is similar to FIGURE 2 except heat has been applied to the mold to form the container.

A modification of the apparatus of FIGURES 1, 2 and 3 is shown in FIGURES 5, 6 and 7 which is particularly adapted to mold articles having undercut surfaces and of variable wall thickness. Referring to FIGURE 5, there is disclosed a lower mold member M consisting of a force plug 11 which is slidably mounted within spring mounted tube 13 to define a mold cavity 12 whose capacity will vary depending upon the position of plug 11 which is reciprocated by ram 19. Actually the ram 19 is capable of moving both plug 2 and tube or sleeve 3, but if the mold operation begins as shown in FIGURE 5, sleeve 3 is not reciprocated but merely moves with respect to plug 2 as it is reciprocated by the ram. On the other hand the molding process set forth in FIGURES 5, 6 and 7 can start with the plug and tube in the position shown in FIGURE 1. Under such circumstances, ram 19 reciprocates both sleeve 3 and plug 2 until they assume the position shown in FIGURE 5. Mold cavity 12 is partially filled with a measured amount of expandable polystyrene beads P, hereinafter described, and the split mold members 14 and 15 of female mold F slide over fixed plate 20 and are brought together in closed position by rams 16 and 17, respectively. Thereafter force plug 11 is caused to ascend and assume the position shown in FIGURE 6. Due to the bead nature of the molding material plus the coaction of plug 11, sleeve 12, and mold members 14 and 15, a uniform distribution of the beads P will take place. Steam then is permitted to enter the heating coils 18 embedded in the walls of mold F and causes the plastic beads to coalesce and expand into a cellular mass by heat conduction to form article or jar 31.

While the method of the invention ordinarily provides for good distribution of the plastic beads without necessity for distributing the beads with a gas, in the case of very thin-walled articles, there will some times be not enough plastic beads to completely load the side portions of the cavity formed by the plug 2 and sleeve 3, as shown in FIGURE 1, and still leave plastic resting on the top of plug 2. In such a case, a slight puffing with steam or other gas to distribute some of the beads after the female part of the mold is closed against the sleeve onto the top of plug 2 is desirable before expansion is effected. The steam or other gas for this distribution is introduced while the sleeve is being moved downwardly. This apparatus is described in FIGURE 8 wherein there is provided in plug 2 a channel 21 which terminates in a hollow chamber 22 connected to a plurality of ports 23 on the surface of the plug. It will be evident from the foregoing description that by introducing a gas, such as steam or air, into channel 21 a uniform distribution of the plastic beads will be insured even where thin-walled articles are being molded.

Figure 4:
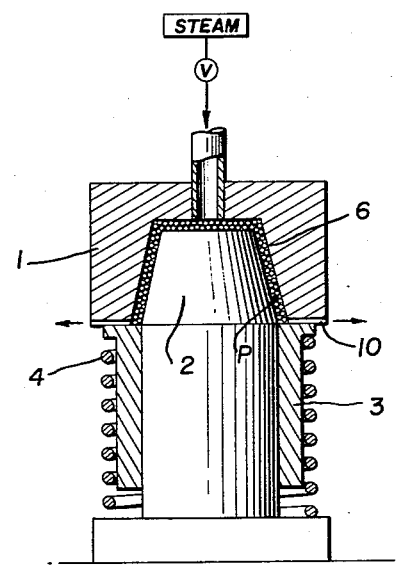
FIGURE 4 shows an alternative means for heating the mold.

From the foregoing description it will be apparent that there has been set forth various embodiments for effecting uniform distribution of heat expandable plastic beads. Various modifications thereof will be evident to those familiar with the art. For example, other means can be employed for heating the plastic beads. In FIGURE 4 there is shown a modification in which the steam is introduced directly into the mold chamber to cause the plastic beads to expand and fuse together. With such a heating system it will be found desirable to provide bleed orifices or channels 19 so as to permit the free flow of the steam through the beads thereby insuring uniform heating thereof. These are shown as located between the lower surface of mold 1 where it contacts the upper surface of tube 3. However, these orifices can be positioned elsewhere, if desired. In the event the modified steam heating system of FIGURE 4 is applied to the apparatus of FIGURES 5, 6 and 7, then bleed orifices can also be employed which can be positioned as desired. Although in FIGURE 4 the steam is introduced through the female mold member, it will be apparent to those familiar with the art that the steam can be caused to enter through a channel (not shown) provided in the force plug 11.

In addition any plastic beads can be employed in the present apparatus providing they will fuse and undergo further expansion upon application of heat. Plastic beads which have been found particularly suitable in the present apparatus are those designated as "Dylite" which are polystyrene beads made by the Koppers Company. These beads are capable of expansion due to the presence of a volatile liquid, such as n-pentane, as an expanding agent. In the unexpanded state these beads are referred to as virgin beads and are capable of being expanded 60 times their original volume. Frequently the beads are partially expanded or given a pre-expansion treatment which consists of heating the virgin beads at 180–240° F. until a density of 1–5 lbs. per cu. ft. is obtained. These pre-expanded beads can then be employed in a subsequent molding process such as that disclosed herein. Although n-pentane has been mentioned as an expanding agent it is obvious that other volatile liquid expanding agents or one of the solid chemical expansion agents, which decompose to yield a gaseous expansion agent on heating, can be employed. It is also apparent that any plastic can be used in the present process provided it is capable of being formed and further expanded upon the application of additional heat although polystyrene is preferred. Further information regarding the properties of "Dylite" are set forth in the Koppers Company, Inc. bulletin entitled "Dylite Expandable Polystyrene" (1959).

Although not shown any suitable ram means can be employed to impart the desired reciprocating motion to the plugs and female molds. In addition the steam heating means can be replaced by other heating means such as electrical heating. Moreover, the heating can be applied to the mold plug (not shown) or to both mold plug and female mold, if desired. It will also be apparent to those skilled in the molding art that the molds and plugs can have different configurations so as to provide for articles in which the walls thereof would not only have a different configuration but would be of varying thickness. Accordingly it will be evident that the simple container shown in the drawings having walls of uniform thickness is merely illustrative and that more complex shaped containers having a varying wall thickness or a finish consisting of a lip or threaded neck could be made with the apparatus of the present invention by appropriate changes in the design or shape of the mold members. Other modifications within the spirit and scope of the present disclosure and appended claims will be suggested to those skilled in the art.

While the illustrative embodiments of the invention have been described hereinbefore with particularity, it will be understood that various other modifications will be apparent to and can readily be made by those skilled in the art without departing from the scope and spirit of the invention.

Accordingly, it is not intended that the scope of the claims appended hereto be limited to the examples and description set forth herein but rather that the claims be construed as encompassing all the features of patentable novelty which reside in the present invention including all features which would be treated as equivalents thereof by those skilled in the art to which the invention pertains.

What is claimed is:

1. Molding apparatus for effecting a uniform distribution of molding material consisting of expandable plastic beads comprising a female mold member, a coacting male mold plug, and a spring mounted loading means located on said plug and cooperating with said plug to form between said plug and loading means a cavity which can be varied in contour and capacity for the retention of said beads.

2. The apparatus of claim 1 in which the female mold member is reciprocable.

3. The apparatus of claim 1 in which heating means are provided for fusing and expanding the beads.

4. The apparatus of claim 2 in which cooling means are provided.

5. Molding apparatus for forming a plastic jar by effecting a uniform distribution of molding material consisting of expandable plastic beads comprising a split female mold having two members, a coacting male mold plug, a movable sleeve mounted on said plug and cooperating with said plug to form a cavity of varying contour and capacity for the retention of said beads, means for reciprocating the female mold members into an open and closed position, and means for reciprocating the male plug at right angles to the motion of the female mold members.

6. Molding apparatus for forming a plastic jar by effecting a uniform distribution of molding material consisting of expandable plastic beads comprising a split upper female mold having two members, a coacting lower male mold plug, a movable sleeve mounted on said plug cooperating with said plug to form a cavity of varying contour and capacity for the retention of said beads, means for reciprocating the female mold members into an open and closed position, and means for reciprocating the male plug at right angles to the motion of the female mold members.

7. A method of forming a plastic article by molding expandable plastic beads whereby a uniform distribution of the beads occurs during the molding process, the steps comprising introducing the beads into an open lower mold structure having a cavity of varying capacity and contour and consisting of a mold plug surrounded by a spring mounted sleeve, effecting a first distribution of the beads in said mold cavity by forcing said sleeve downward by a female mold member, thereafter effecting a further distribution of said beads by bringing said plug and female mold member into a closed position which defines the shape of the article desired, thereafter applying heat to one of the mold members so as to fuse and expand the plastic beads, and then cooling the mold to set the article.

References Cited in the file of this patent

UNITED STATES PATENTS

| | | |
|---|---|---|
| 2,066,993 | McCombs | Jan. 5, 1937 |
| 2,304,989 | Snowdon | Dec. 15, 1942 |
| 2,369,488 | Perry | Feb. 13, 1945 |
| 2,378,642 | Kopplin | June 19, 1945 |
| 2,558,027 | Wilson | June 26, 1951 |
| 2,789,332 | Scott | Apr. 23, 1957 |
| 2,796,634 | Chellis | June 25, 1957 |
| 2,951,260 | Harrison et al. | Sept. 6, 1960 |
| 3,013,306 | Richie et al. | Dec. 19, 1961 |

OTHER REFERENCES

Koppers booklet, "Dylite-Expandable-Polystyrene," 1954, pp. 21–23. (Copy in 18–48S.)